United States Patent [19]

Rassbach

[11] 4,289,171

[45] Sep. 15, 1981

[54] TUBULAR PACKAGING SHEATH AND PROCESS FOR ITS MANUFACTURE

[75] Inventor: Felix Rassbach, Wiesbaden, Fed. Rep. of Germany

[73] Assignee: Hoechst Aktiengesellschaft, Frankfurt am Main, Fed. Rep. of Germany

[21] Appl. No.: 43,103

[22] Filed: May 29, 1979

[30] Foreign Application Priority Data

May 26, 1978 [DE] Fed. Rep. of Germany ....... 2822886

[51] Int. Cl.$^3$ ........................... F16L 11/02; B32B 1/08
[52] U.S. Cl. .................................. 138/145; 138/118.1; 206/802; 427/412.1; 427/415; 427/339; 428/36; 428/527; 428/536
[58] Field of Search ................. 428/36, 508, 510, 527, 428/536; 206/802; 8/57, 54.2, 63, 116 R; 426/105; 427/331, 372, 402, 412.1, 415; 138/118.1, 145

[56] References Cited

U.S. PATENT DOCUMENTS

| | | | |
|---|---|---|---|
| 2,866,710 | 12/1958 | Dowd et al. | 428/527 |
| 3,309,218 | 3/1967 | Brader, Jr. et al. | 428/510 |
| 3,378,379 | 4/1968 | Shiner et al. | 99/176 |
| 3,484,256 | 12/1969 | Chiu et al. | 426/105 |
| 3,539,361 | 11/1970 | Coleman | 428/536 |
| 3,867,182 | 2/1975 | Hammer et al. | 260/29.4 R |
| 3,935,320 | 1/1976 | Chiu et al. | 426/105 |

FOREIGN PATENT DOCUMENTS

| | | |
|---|---|---|
| 568820 | 5/1931 | Fed. Rep. of Germany . |
| 2312385 | 10/1974 | Fed. Rep. of Germany . |
| 2539706 | 9/1975 | Fed. Rep. of Germany . |
| 2209513 | 5/1974 | France . |
| 2224088 | 10/1974 | France . |
| 2322973 | 1/1977 | France . |

*Primary Examiner*—Paul J. Thibodeau
*Attorney, Agent, or Firm*—Schwartz, Jeffery, Schwaab, Mack, Blumenthal & Koch

[57] ABSTRACT

Disclosed is a packaging material, comprising a fibrous base web wherein at least a part of the fibers forming said base web include at least a partial coating of a mixture of chemical substances which comprise a predominant proportion of a chemical binder based on a synthetic water-soluble heat-curable cationic resin precondensate and of a minor proportion of at least one coloring chemical substance, the proportions being relative to the total weight of the mixture of substances. Also disclosed is a method of manufacturing this packaging material and a sausage casing made therefrom.

16 Claims, No Drawings

TUBULAR PACKAGING SHEATH AND PROCESS FOR ITS MANUFACTURE

BACKGROUND OF THE INVENTION

It is known to produce tubular packaging sheaths based on fiber-reinforced cellulose hydrate, by impregnating and coating a paper fiber tube with viscose solution which contains a dispersed or dissolved dyestuff, then allowing a liquid precipitant to act on the tube, washing the tube, treating it, if desired, with a liquid containing a chemical plasticizer, and then drying the tube.

The known process has the disadvantage that, as a result of the dispersed constituent in the viscose, the formation of the cellulose hydrate structure of the tube is disturbed and hence its mechanical properties are adversely influenced.

SUMMARY OF THE INVENTION

It is an object of the present invention to provide an improved tubular packaging sheath.

It is another object of the invention to provide an improved tubular packaging sheath based on cellulose hydrate, which includes a fiber reinforcement and contains a coloring chemical substance without detriment to the mechanical properties of the packaging sheath.

It is a further object of the invention to provide an improved tubular packaging sheath wherein the tube wall does not contain, other than cellulose hydrate and, optionally, one or more chemical plasticizers, any other chemical compounds which influence the physical properties of the cellulose hydrate.

It is a further object of the invention to provide a process for manufacturing the tubular packaging sheath of the invention.

Still another object of the invention relates to the use of the packaging sheath according to the invention as an artificial sausage casing.

In accomplishing the foregoing objects, there has been provided in accordance with the present invention a packaging material, preferably in tubular form, comprising a fibrous base web, wherein at least a part of the fibers forming said base web include at least a partial coating of a mixture of chemical substances which comprise a predominant proportion of a chemical binder based on a hydrophilic heat-cured synthetic resin precondensate and of a minor proportion of at least one optically active chemical substance, the proportions being relative to the total weight of the mixture of substances.

According to another aspect of the present invention, there has been provided a process for the manufacture of a tubular packaging sheath, comprising the steps of:

applying to at least one surface of a fiber web a liquid which contains a solid constituent comprising a mixture having a predominant proportion of a hydrophilic synthetic resin precondensate and a minor proportion of an optically active chemical substance, relative to the total weight of the solid constituent of the liquid;

removing the liquid volatile constituent of the liquid;

forming a tube from the fiber web;

impregnating and coating the tube with a viscose solution;

treating the tube with a precipitating liquid for the viscose to regenerate the viscose; and Washing the regenerated cellulose impregnated and coated tube.

There has also been provided in accordance with the present invention an artificial sausage casing embodying the packaging material of the invention and preferably made according to the process of the invention.

Other objects, features and advantages of the present invention will become apparent from the detailed description of preferred embodiments which follows.

DETAILED DESCRIPTION OF PREFERRED EMBODIMENTS

The fiber coating of the mixture of chemical materials is located directly on the fiber surface.

The term "coloring chemical compound" is to be understood as meaning inorganic chemical substances as well as organic chemical compounds which are capable of partial absorption of light waves of the visible range of light, and which can act as dyestuffs.

The term also embraces mixtures of coloring chemical compounds of chemically different structure, for example, a mixture of at least two coloring chemical compounds, with the individual chemical compounds each absorbing light waves of differing wavelength from within the visible range of light.

The volatile liquid constituent of the liquid consists of water or aliphatic organic chemical substances which are suitable for use as solvents for the optically active chemical compounds and/or the synthetic hydrophilic resin precondensates, such as, for example, aliphatic alcohols, preferably lower alcohols, and especially ethanol or isopropanol. The volatile liquid constituent of the liquid can also consist of aqueous solutions of the alcohols mentioned. Additional suitable organic aliphatic solvents are aliphatic ethers, (preferably lower aliphatic), esters and ketones or mixtures thereof.

The chemical binder used in the present application is a synthetic water-insoluble, cationic resin obtained from a water-soluble cationic resin pre-condensate by heat-curing. Because of its molecular structure, the heat-curable precondensate is still water-soluble; by the action of heat (heat-curing), it can be hardened and converted into a water-insoluble state.

In the present invention, the chemical binder is in the state of having been cured by the action of heat, that is to say, in the water-insoluble state.

The term "water-soluble heat-curable cationic resin precondensates" also includes mixtures of chemical compounds of the type mentioned which are of different chemical structure.

The solids constituent of the liquid which, according to the process, is allowed to act on at least one surface of the fiber web, consists of a mixture of substances wherein the predominant proportion is a synthetic resin precondensate and the minor proportion is a coloring chemical substance, the proportion in each case being relative to the total weight of the mixture of substances.

The mixture of solid substances forms the minor proportion of the liquid, while the liquid volatile chemical agent (solvent or dispersant) represents the major proportion of the liquid, in each case relative to the total weight of the liquid.

The following synthetic water-soluble heat-curable cationic resin precondensates are particularly suitable for the preparation of the heat-curable water-insoluble cationic resin forming the chemical binder:

1. Chemical reaction products which are obtained (a) by a condensation reaction of urea and aldehydes, preferably formaldehyde, or (b) by a condensation reaction of melamines and aldehydes, preferably formaldehyde, and 2. Chemical reaction products which are obtained (a) by a chemical reaction of epichlorohydrin with a polyaminopolyamide, (b) by a chemical reaction of epichlorohydrin with a polyamine, (c) by a chemical reaction of epichlorohydrin with a polyamide, or (d) by a chemical reaction of epichlorohydrin with a mixture of a polyamine and a polyamide.

Of the above mentioned reaction products, the condensation products of epichlorohydrin with a polyamine or with a polyamine-polyamide are particularly advantageous for the purposes of the present invention.

Preferably, the polyamines used (by which term diamines are to be embraced) are simple alkylenediamines and polyalkylenepolyamines (by which latter term dialkylenetriamines are to be embraced), and there may be mentioned among these preferred polyamines diethylenetriamine, triethylenetetramine, tetraethylenepentamine, and the corresponding polypropylenepolyamines and polybutylenepolyamines (e.g. dibutylenetriamine). To manufacture the corresponding chlorohydrin resins, the polyamines are reacted with more than one mole of epichlorohydrin per mole of polyamine. In general, from 1.5 to 4.0 moles of epichlorohydrin, preferably from 2 to 3 moles, are employed. The reaction may be suitably carried out in aqueous solution at a moderately elevated temperature (about 50° C.), until the desired degree of viscositiy is reached.

Reaction products of epichlorohydrin with dipropylenetriamine or with bis(3-aminopropyl)methylamine, advantageously those formed by reacting 2.8 to 3.8 moles of epichlorohydrin with 1 mole of polyamine, are especially preferred for use in the process of the present invention.

Amongst suitable polyamine-polyamides there may be mentioned condensation products of a saturated aliphatic dibasic acid which possesses 3 to 8 carbon atoms in the molecule with any of the above-mentioned polyamines that possesses at least one secondary and two primary amine groups, for example, one of the above-mentioned polyalkylenepolyamines. Diglycollic acid, succinic acid, glutaric acid and adipic acid are preferred dibasic acids. It is also possible to use a mixture of dibasic acids, in which case the mixture may also contain acids which possess more than eight carbon atoms in the molecule provided that their proportion in the mixture does not prevent the polyamine-polyamide manufactured therefrom from being genuinely soluble or at least colloidally soluble in water. A part of the polyamines to be reacted with the dibasic acid and having at least one secondary and at least two primary amino groups can be replaced by alkylenediamines, the proportion of the latter being up to 30%. The reaction between the polyamine and the dibasic acid is carried out at from 110° to 250° C., mostly at from 160° to 210° C., from 0.8 to 1.4 moles of the acid being employed per mole of polyamine. The polyamine-polyamides obtained are advantageously reacted, in aqueous solution at about 50° C., with from 0.5 to 1.8 moles of epichlorohydrin per secondary amino group, from 0.9 to 1.5 moles of epichlorohydrin preferably being used.

Suitable coloring chemical substances are both inorganic substances, such as, for example, titanium dioxide, iron oxide, cobalt oxide, carbon black or aluminum, in a particle size appropriate for use as a dyestuff, and organic chemical compounds, especially organic water-soluble chemical compounds, of which the chemical structure is given under Color Index numbers 11,765; 21,100; 21,108; 21,110; 12,370; 12,420; 71,100; 12,517; 51,319; 74,160 and 77,266 in the "Color Index", Volume IV, 3rd edition, 1971, published by "The Society of Dyers and Colourists", Great Britain, in particular the organic chemical compounds corresponding to the Color Index numbers 21,110 and 71,100. It is also possible to use mixtures of chemically different coloring chemical compounds, especially mixtures of the compounds having the chemical structure corresponding to the Color Index numbers mentioned, for example, mixtures of inorganic coloring chemical compounds or mixtures of organic coloring chemical compounds or mixtures of inorganic coloring chemical compounds with organic coloring chemical compounds.

The application of the liquid, containing a mixture of chemical binders in the form of synthetic water-soluble, heat-curable cationic resin precondensates and coloring chemical compounds, onto at least one fiber web surface can be effected in a manner which is in itself known, by conventional means, for example, by doctor blade coating. The particular technique of applying the mixture is not the subject of the present invention.

Advantageously, the liquid has a viscosity in the range from about 4 to 200 cP at room temperature, preferably from about 20 to 180 cP, and most advantageously between 140 and 160 cP.

The liquid consists of 60 to 90 percent by weight of a volatile liquid chemical agent, preferably water, or an aliphatic alcohol, especially ethanol or isopropanol, or aqueous solutions of the said alcohols, and of a total of from about 40 to 10 percent by weight of a mixture of chemical substances of which a part consists of chemical binders in the form of synthetic water-soluble heat-curable cationic resin precondensates while the other part consists of the coloring chemical compound. The weight percentage data in each case relates to the total weight of the liquid. The solids constituent of the liquid consists of from about 70 to 90 percent by weight of a synthetic hydrophilic resin precondensate and of from about 30 to 10 percent by weight of an optically active chemical compound, in each case based on the total weight of the solids constituent of the liquid.

The liquid is applied to at least one surface of the fiber web, in an amount so that, after driving off the volatile component of the liquid, there is from about 1 to 8 g of the solids constituent of the liquid present per square meter of carrier surface.

The fiber web advantageously consists of long-fibered paper, and particularly preferentially of a random arrangement of hemp fibers.

A particularly preferred liquid contains about 75 percent by weight of water as the volatile liquid agent, the weight percentage being relative to the total of the liquid, and a total of about 25 percent by weight, based on the total weight of the liquid, of a solids constituent, which in turn consists of about 70 percent by weight of a water-soluble cationic resin precondensate, for example, a melamine-formaldehyde precondensate, and of about 30 percent by weight of a coloring chemical compound, for example, a compound corresponding to the chemical structure according to Color Index number 21,110. The weight percentage data for the solids in each case relate to the total weight of the solids constituent of the liquid.

The liquid is advantageously applied to the surface of the fiber web, for example, of a paper web, in an amount so that, after driving off the volatile agent of the liquid, for example, by the action of sufficient heat in an appropriately heated drying tunnel, the proportion of the solids mixture of the liquid, deposited on the fiber web surface, is about 5 g per m$^2$ of substrate. The paper fiber web, for example, weighs about 21 g/m$^2$.

The liquid is applied to the fiber web surface with the aid of, for example, a water doctor or air doctor.

The fiber web which has been pretreated in the above manner on its surface with the mixture of substances is then shaped, along the longitudinal axis, with the aid of a known folding plate, to form a tube, and the overlapping side edges of the web are then glued together. The fiber web is folded to form a tube in such a way that at least the outer face of the fiber tube exhibits fibers at least partially coated with the mixture of substances mentioned.

Thereafter, the pretreated fiber tube is impregnated and coated with a viscose solution in a manner which is conventional. The tube which is impregnated and coated with viscose solution is then subjected to the action of a precipitating liquid, and the resulting cellulose hydrate tube which is in the gel state is then washed, for example, with water, treated with an aqueous liquid containing chemical plasticizer, for example, glycerol or glycol, then dried, for example at from about 60° to 120° C., and, if desired, moistened with water to adjust its moisture content.

The impregnation and coating of the pretreated fiber tube with viscose is carried out in a manner which is conventional with the aid of known devices (coating nozzles), for example in the manner described in British Patent No. 1,330,698, the disclosure of which is hereby incorporated by reference.

EXAMPLE 1

The surface of a paper fiber web weighing 21 g/m$^2$ is exposed to a liquid of the following composition, using a doctor device: 75 percent by weight of water and 25 percent by weight of solids constituent, in each case relative to the total weight of the liquid, the solids constituent consisting of 70 percent by weight of water-soluble melamine-formaldehyde precondensate and of 30 percent by weight of an organic chemical compound according to Color Index number 21,110.

The liquid is applied to the surface of the fiber web in such amount as to provide 4 g of solids constituent of the liquid per m$^2$ of fiber web surface.

The fiber web is then passed through a drying tunnel heated to 110° C., during which the volatile agent of the liquid is driven off.

The fiber web is then shaped along the longitudinal axis to form a tube, in such a way that the side of the fiber web which has been treated with the liquid forms the outer face of the fiber tube.

Thereafter the fiber tube is impregnated, and coated, with viscose solution in a manner which is in itself known, treated with a precipitating liquid and subsequently with a liquid containing a chemical plasticizer, dried by the action of heat and, if appropriate, moistened with water.

EXAMPLE 2

A fiber tube is prepared as in Example 1, except with the modification that the resin precondensate consists of an epichlorohydrin-polyamino-polyamide resin and the optically active chemical organic compound corresponds to a chemical structure according to Color Index number 71,100.

The process according to the invention makes it possible to manufacture colored packaging sheaths which have the advantage that the coloring chemical substance does not interfere with the formation of the optimum structure of the cellulose hydrate forming the tube and hence does not lead to any deterioration of the physical properties of the tubular sheath. The same is also true when using liquids wherein the optically active chemical substance absorbs in the ultraviolet wavelength range of daylight and hence acts as a stabilizer against ultraviolet light.

What is claimed is:

1. A packaging material, comprising a fibrous web wherein at least a part of the fibers forming said base web include at least a partial coating of a mixture of chemical substances which comprise a major proportion by weight of a chemical binder based on a synthetic water-soluble heat-curable cationic resin precondensate and of a minor proportion by weight of at least one coloring chemical substance, and a layer of regenerated cellulose impregnating and coating said fibrous base web which is at least partially coated with said mixture of chemical substances, said packaging material being produced by a method comprising the steps of applying to at least one surface of said fibrous web a liquid containing a solids constituent comprised of said mixture of chemical substances, removing the liquid volatile constituent of said liquid, thereafter impregnating and coating the fibrous web with a viscose solution, and regenerating said viscose to produce said regenerated cellulose impregnated and coated fibrous web.

2. A packaging material according to claim 1, wherein said mixture comprises from about 70 to 90 percent by weight of synthetic water-soluble heat-curable cationic resin precondensate and from about 30 to 10 percent by weight of coloring chemical compound, in each case relative to the total weight of the mixture.

3. A packaging material according to claims 1 or 2, wherein said synthetic resin precondensate comprises a melamine-formaldehyde precondensate, a urea-formaldehyde precondensate or an epichlorohydrin-polyamido-polyamine resin and said coloring chemical substance comprises a compound having a chemical structure corresponding to one of the Color Index numbers 11,765; 21,100; 21,108; 21,110; 12,370; 12,420; 71,100; 12,517; 51,319; 74,160 or 77,266.

4. A packaging material according to claims 1 or 2, wherein said synthetic resin precondensate comprises a melamine-formaldehyde precondensate, a urea-formaldehyde precondensate or an epichlorohydrin-polyamido-polyamine resin, and said coloring chemical substance comprises an inorganic chemical substance selected from the group consisting of titanium dioxide, iron oxide, cobalt oxide, carbon black, and aluminium.

5. A packaging material according to claims 1 or 2, wherein the mixture of substances comprises about 70 percent by weight of a melamine-formaldehyde precondensate, a urea-formaldehyde precondensate or an epichlorohydrin-polyamine-polyamide resin and a total of about 30 percent by weight of said coloring chemical substance, the percentages in each case being relative to the total weight of the mixture.

6. A packaging material according to claim 5, wherein said coloring chemical substance comprises a compound having a chemical structure corresponding to one of the Color Index numbers 11,765; 21,100; 21,108; 21,110; 12,370; 12,420; 22,100; 12,517; 51,319; 74,160 or 77,266.

7. A packaging material according to claim 6, wherein said coloring chemical substance comprises a compound having a chemical structure corresponding to Color Index numbers 21,100 or 71,000.

8. A packaging material according to claim 5, wherein said coloring chemical substance comprises an inorganic material selected from the group consisting of titanium dioxide, iron oxide, cobalt oxide, carbon black and aluminium.

9. A packaging material according to claim 1, in the form of a tubular sheath of said packaging material.

10. A process for the manufacture of a tubular packaging sheath, comprising the steps of:
applying to at least one surface of a reinforcing fibrous web a coating liquid which contains a solids constituent comprising a mixture having a major proportion by weight of a synthetic water-soluble heat-curable cationic resin precondensate and a minor proportion by weight of a coloring chemical substance;
removing the liquid volatile constituent of the liquid;
forming a tube from the fiber web;
impregnating and coating the tube with a viscose solution;
treating the tube with a precipitating liquid for the viscose to regenerate the viscose; and
washing the regenerated cellulose impregnated and coated tube.

11. A process according to claim 10, wherein the major proportion of the solids constituent in the coating liquid comprises a melamine-formaldehyde precondensate, a urea-formaldehyde precondensate or an epichlorohydrin-polyamine-polyamide resin and the minor proportion comprises a coloring organic compound corresponding to the chemical composition of Color Index numbers 11,765; 21,100; 21,108; 21,110; 12,370; 12,420; 71,100; 12,517; 74,160; 77,266 and 51,319.

12. A process according to claim 10, wherein the major proportion of the solids constituent in the coating liquid comprises a melamine-formaldehyde precondensate, a urea-formaldehyde precondensate or an epichlorohydrin-polyamine-polyamide resin, and the minor proportion comprises an inorganic coloring chemical substance selected from the group consisting of titanium dioxide, iron oxide, cobalt oxide, carbon black and aluminium.

13. A process according to claim 11, wherein the coating liquid comprises about 75 percent by weight of water and about 25 percent by weight of a solids constituent, in each case relative to the total weight of the liquid, and the solids constituent comprises about 70 percent by weight of a melamine-formaldehyde precondensate or an epichlorohydrin-polyamine-polyamide resin and about 30 percent by weight of an organic chemical compound corresponding to the structure according to Color Index numbers 21,110 or 12,420, the percentages of the solids being relative to the total weight of the solids constituent.

14. A process according to claims 11 or 12, wherein the solids constituent-containing coating liquid is applied to at least one surface of the fiber web in an amount so that an amount in the range of from about 1 to 8 g of solids constituent of the liquid is deposited per $m^2$ of fiber web surface.

15. A process according to claim 14, wherein the amount of solids constituent of the coating liquid deposited on the fiber web is about 5 g per $m^2$ of fiber web surface.

16. An artificial sausage casing comprising a tubular packaging sheath prepared by the process defined by claim 10.

* * * * *